Figure 1:
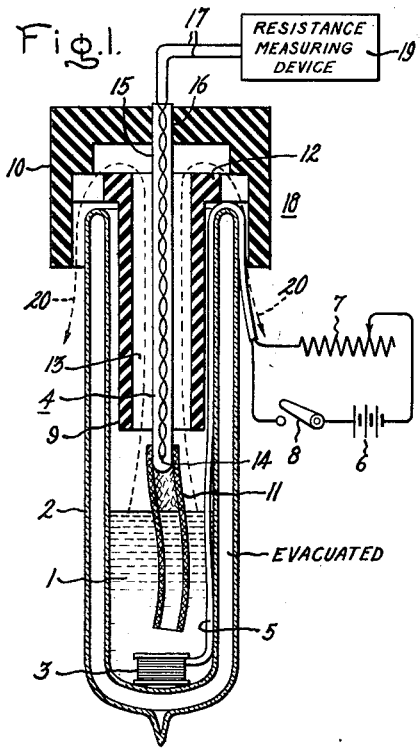

May 4, 1954     T. A. RICH     2,677,279

PRESSURE MEASURING APPARATUS

Filed Aug. 23, 1949

Inventor:
Theodore A. Rich,
by Richard E. Hooley
His Attorney.

Patented May 4, 1954

2,677,279

UNITED STATES PATENT OFFICE 2,677,279

PRESSURE MEASURING APPARATUS

Theodore A. Rich, Schenectady, N. Y., assignor to General Electric Company, a corporation of New York Application August 23, 1949, Serial No. 111,913

3 Claims. (Cl. 73—384)

My invention relates to apparatus of the hypsometer type for measuring pressure by determining the boiling temperature of a liquid.

It is well known that the boiling temperature of a particular liquid is a function of the ambient pressure surrounding the liquid, an increase in temperature in general being caused by an increase in pressure. Accordingly it has been found that accurate determinations of pressure may be made by making use of the boiling temperature— ambient pressure relationship of a liquid. The art of hypsometry, therefore, is not in itself new. A number of devices have been employed wherein a liquid is caused to boil and the boiling temperature thereof is sensed by thermometers or the like.

It is also well known that the pressure of the earth's atmosphere is a function of the altitude above a reference point. In making measurements of altitude many devices make use of the change of atmospheric pressure with change of altitude. In some devices however, such as a bellows mechanism, it is difficult to obtain uniformly accurate determinations of pressure over a wide range of altitudes due to the constant-pressure-error characteristic inherent in such devices, resulting frequently in relatively large percentage errors. A hypsometer, on the other hand, is largely immune to errors caused by temperature, hysteresis, friction and back-lash which may exist in bellows and associated linkage mechanisms. Therefore a hypsometer is particularly well suited for making altitude measurements and the use of a hypsometer device is desirable in many altitude measuring applications.

The use of a hypsometer device has been found particularly advantageous in making measurements of high altitudes in conjunction with radio-sonde apparatus from which meteorological information is transmitted to receiving stations on the ground. A hypsometer for such a purpose is preferably small and light, capable of a high degree of accuracy, and suitable for supplying information to radio transmitting apparatus. Further, such a hypsometer preferably requires only a small amount of heat to effect and maintain boiling of the liquid therein, and is little affected by ambient conditions with the exception of pressure.

It is therefore an object of my invention to provide a hypsometer apparatus of new and improved design having a high degree of accuracy over a wide range of pressures, and which is particularly suitable for use in making measurements of altitudes in radio-sonde and the like.

It is another object of my invention to provide a hypsometer apparatus which is small in size, light in weight, and simple in construction and which comprises relatively inexpensive and easily obtainable components.

It is a further object of my invention to provide a hypsometer apparatus from which electrical intelligence is readily obtainable.

Broadly speaking, my invention makes use of a suitable vessel, preferably a vacuum insulated flask, containing a small amount of a liquid, the latter having a heating element, preferably electrical, submerged therein and arranged to boil the liquid, and a temperature-responsive electrical element, preferably a resistance element of the type known as a thermistor, arranged to sense the temperature of the boiling liquid or the vapors thereof.

Figure 2C:
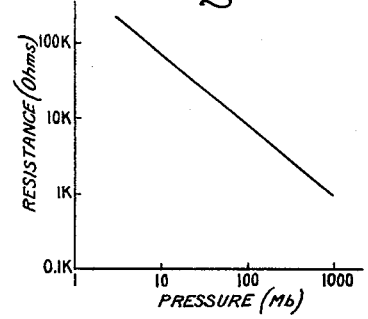
Figure 2A:
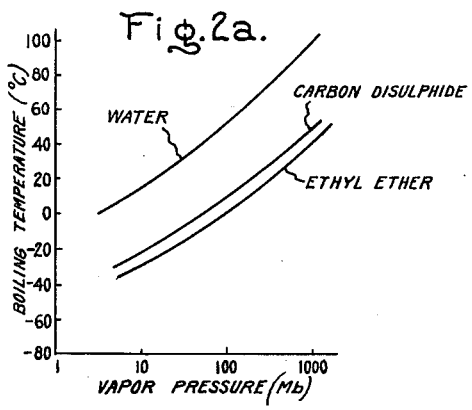
Figure 3:
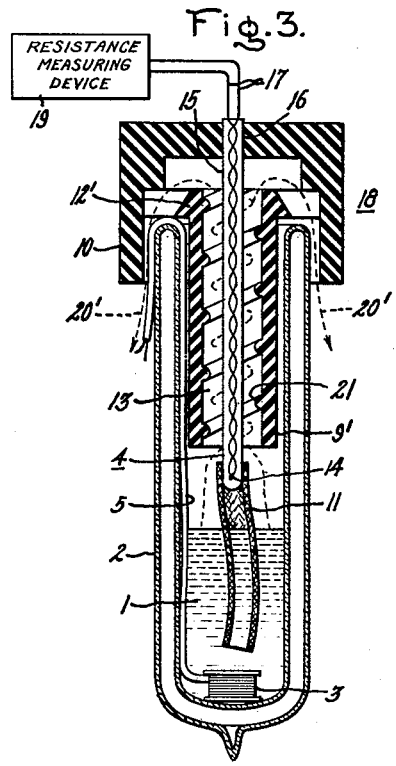
Figure 2B:
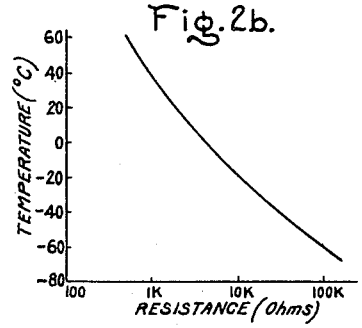

For a better understanding of my invention, attention is now directed to the following description taken in connection with the figures of the accompanying drawing. In the drawing Fig. 1 represents in longitudinal section a hypsometer device embodying the features of my invention; Figs. 2a, 2b, and 2c are curves representing certain characteristics whereof use is made in my invention. Fig. 3 represents a device similar to the device shown in Fig. 1 with the addition of a supplementary condensing surface.

Referring now to Fig. 1, there is shown a hypsometer device particularly suitable for use in measuring relatively high altitudes in connection with radio-sonde apparatus or the like, but not limited to this particular use. The hypsometer device shown comprises principally a quantity of liquid 1 contained in a suitable vessel 2, a heating device 3, and a temperature-sensing element 4. In considering the configuration and dimensions of vessel 2, in general, it is desirable that in the use of the hypsometer a minimum amount of heat be required to maintain boiling of liquid 1. Under conditions of increasing altitude it has been determined that the boiling temperatures of most liquids decrease due to decrease in pressure at the rate of approximately one degree centigrade per thousand feet increase in altitude. Therefore, if the heat loss from the hypsometer may be made sufficiently low, boiling of the liquid, once started, may be maintained by heat in the liquid itself without the continuing addition of heat during an ascent. In some cases, however, it may be necessary to add a certain amount of heat to maintain boiling, particularly at extremely low ambient temperatures or at relatively low rates of ascent.

In most cases it is desirable to provide a maximum amount of thermal insulation in vessel 2 and I have found that a double-walled vacuum flask, preferably formed of glass, is a particularly suitable type of vessel. Such a flask is of conventional design and is commercially obtainable. It is desirable that flasks for this purpose be relatively thin-walled and silvered on the inside surfaces to reduce heat dissipation to a minimum.

Preferably the flask is arranged in a position as shown in Fig. 1, with the mouth pointing upward. In this position liquid 1 is contained wholly within the inner cavity of flask 2, thereby eliminating leakage and other problems present in an inverted or other types of arrangement. With a flask 2 having an outside diameter of one inch, an inner diameter of eleven-sixteenths of an inch, and a length of three and one-quarter inches, a convenient volume of liquid 1 is approximately six cubic centimeters.

While any desirable method of heating and boiling liquid 1 may be employed, I have found that an electric heating element of the immersion type is a particularly convenient heating device. In Fig. 1, heating device 3 is shown as a small coil formed of suitable heating wire immersed in liquid 1 and resting on the inner surface of flask 2. Connections to heating element 3 may be made by the use of a pair of conductors 5 attached thereto and carried along the inner wall of flask 2 over the mouth thereof and thus outside the hypsometer. Electric energy may be supplied to heating element 3 by the use of a suitable source such as a dry cell 6, and adjustment of the heating current may be made by the use of an adjustable resistance 7 connected in series with heating element 3 and battery 6. A switch 8 is also connected in series with heating element 3, battery 6, and resistance 7, and may be employed to cut off the heating current if desired once boiling of liquid 1 has been started. Care must be taekn to keep the heat conductivity of the leads low so that they do not conduct heat from the liquid to the outside.

It will be helpful before proceeding further in the description to describe the remaining elements of the hypsometer. In the arrangement of Fig. 1 these elements are an insert 9, a cap 10, and a wick 11. Insert 9 is preferably formed of a cast plastic material such as the material known as styrene to which a dark filler material may be added to make the casting stronger and the casting process easier. It is necessary to choose a material which will not be affected by the boiling liquid. Insert 9 is arranged to fit into the mouth of flask 2 and to be supported in contact therewith by flange 12. The functions of insert 9 are to serve as thermal insulation for the hypsometer and to support cap 10. A passage 13 is provided approximately at the axial center of insert 9 to serve as an escape path for the vapors of boiling liquid 1. I have found that in insulating the mouth of flask 2 the length of insert 9 is more important than the shape thereof or the size of passage 13. If insert 9 is made relatively long, a high degree of insulation is provided for the mouth of flask 2.

Cap 10 may be conveniently formed of the same material as insert 9, although if flask 2 is well enough insulated by insert 9, the material of cap 10 is unimportant. The principal function of cap 10 is to cover the top of insert 9, thereby reducing convection currents and improving insulation. Cap 10 also serves to support temperature-sensitive element 4, the latter being located at the approximate center of passage 13 in insert 9.

Depending on the type of measuring apparatus to be employed in connection with the hypsometer a number of devices may be employed for temperature-sensitive element 4. A device which has been found to be particularly suitable in a hypsometer apparatus of the type herein described is a resistance formed of a material having a negative resistance-temperature co-efficient in which the resistance-temperature relationship is essentially logarithmic and known in the art as a thermistor. In Fig. 1 temperature sensitive element 4 is represented as being a thermistor 14 suitably sealed in a tube 15 which may be formed of glass or other suitable material. Thermistor 14 is positioned at one extremity of tube 15, the other extremity thereof being fixed in an opening 16 in cap 10 by an adhesive cement or other suitable means. Connections to thermistor 14 are made by the use of a pair of leads 17 extending from thermistor 14 through tube 15 and thus to the outside of the hypsometer.

While in the embodiment herein described I have represented temperature-sensing element 4 as a thermistor 14, it will be obvious that temperature-sensing element 4 may well take other forms. For example, a resistance having a positive resistance-temperature coefficient rather than a thermistor, or a temperature-responsive source of electromotive force such as a thermocouple may be employed for temperature-sensing element 4. The choice of a suitable temperature-responsive device for temperature-sensing element 4 is primarily dependent on the application in which a hypsometer is to be employed.

Referring again to Fig. 1, it will be noted that insert 9 extends slightly less than half the length of flask 2 and that tube 15 is of such a length that thermistor 14 extends slightly beyond the lower extremity of insert 9.

While a wick 11 is shown as an arrangement of the hypsometer of Fig. 1, it will be understood that such a wick does not constitute a part of my invention but is described and claimed in a co-pending application Serial No. 111,899 of Wayne R. Norman, filed August 23, 1949, now U. S. Patent 2,599,276, and assigned to the same assignee as the present invention. It will be seen by reference to Fig. 1 that wick 11 is represented as encasing the extremity of tube 15 to a point above thermistor 14 and extends into liquid 1 substantially below the surface thereof. Wick 11 is preferably formed of a porous flexible material such as cotton and may be, for example, a tubular cotton braid of the type employed in insulating electrical conductors.

In practice, it is desirable to combine temperature-sensing element 4, insert 9, cap 10, and wick 11 into a sub-assembly. Such a sub-assembly, which is designated by numeral 18, thus includes all of the elements of the hypsometer proper with the exception of flask 2 and heating element 3. To assemble the hypsometer for operation therefore is a simple matter. The proper amount of liquid 1, in this case six cubic centimeters, is poured into flask 2. Heater 3 is then dropped into flask 2 and leads 5 are brought out over the mouth thereof. Sub-assembly 18 is inserted in the mouth of flask 2 and the hypsometer is then completely assembled and ready for connection to associated apparatus. Heater leads 5 are connected to the circuit of source 6. Thermistor leads 17 are connected to a suitable resistance-measuring device 19 which in the case of a radio-sonde may be a relaxation oscillator. In other cases, resistance-measuring devices 19 may be a suitable bridge or other network of a conventional type.

In considering the choice of liquid 1, I have found that, while a number of liquids are suitable for use in a hypsometer, the choice of a particular liquid is dependent upon the application in which a hypsometer is to be employed. In an ascent to relatively high altitudes above the earth's surface, for example 150,000 feet, the problem of duration of boiling is relatively serious. Assuming an ascent of 1000 feet per minute to an altitude of 150,000 feet, continuous boiling is required for two and one-half hours. The differential between the boiling temperature of a hypsometer liquid and the ambient temperature of the atmosphere surrounding the hypsometer varies widely during such an ascent, the maximum differential being approximately 75° centigrade.

High ambient temperatures may cause heat transfer into the hypsometer which results in increased boiling and hence shorter duration of the liquid. Low ambient temperatures may increase heat losses and if sufficiently great may require more heat to be added electrically through the heating element of the hypsometer. Since, as noted, the differential between boiling and ambient temperatures varies widely during an ascent, a thermal equilibrium in the hypsometer at the altitude of maximum temperature differential may result in an excess of heat at other altitudes. Minimum dissipation of the hypsometer is desirable so that heat requirements may be less at altitudes at which the differential is less than the maximum differential.

It is desirable for long duration of boiling to employ a liquid having a relatively high heat of vaporization in order that a minimum amount of liquid is boiled off due to an excess of heat over a long period of time. In many respects water is an ideal liquid for use in a hypsometer since it has both a high heat of vaporization and a high ratio of heat of vaporization to specific heat, the significance of the latter property being that a minimum of liquid need boil off to cool the remainder. While water is satisfactory at high pressures, at a pressure of 6.1 mb. (corresponding to an altitude of approximately 115,000 feet) water boils at zero degrees centigrade and then freezes. In the use of water at lower pressures, therefore, there is ambiguity as to whether ice or supercooled water is present and accordingly at pressures below 6.1 mb. liquids other than water are more desirable.

A number of other liquids are suitable for use at pressures below which water is unsuitable, although certain liquids may be undesirable for reasons other than freezing. In particular methyl and ethyl alcohols give results showing poor consistency due to variations in water content in the alcohols which are highly hygroscopic, and therefore the use of alcohols in hypsometers is undesirable.

If a hypsometer has a relatively low rate of heat dissipation, liquids having lower heats of vaporization than water may be employed. Accordingly, I have found that ether and carbon disulphide are suitable liquids at pressures below which water is unsuitable. Thus, these liquids may be employed at a minimum pressure of approximately 0.5 mb. which corresponds to an altitude of approximately 200,000 feet. Carbon disulphide has a higher duration than ether and is in general preferable thereto.

While water and carbon disulphide are particularly suitable for use in a hypsometer for the respective minimum pressure noted, those skilled in the art will undoubtedly find other suitable liquids which may be employed in hypsometers. It will be noted that a further consideration in the selection of a suitable liquid is the possible degree of accuracy attainable therewith. Attainable accuracy is dependent on such properties of a liquid as molecular elevation of boiling point due to the presence of dissolved substances or, as in the case of alcohol, the presence of absorbed moisture. While the presence of impurities in a liquid alters the boiling point thereof, commercial grades of the liquids noted generally contain relatively small amounts of impurities and permit a relatively high degree of accuracy to be obtained when used in a hypsometer of the type herein embodied.

In Figs. 2a, 2b, and 2c, certain characteristics relative to the elements of a hypsometer are shown which will be helpful in understanding my invention. In Fig. 2a the characteristic curves of boiling temperature vs. pressure for various liquids are shown. In Fig. 2b the characteristic curve of resistance vs. temperature for a typical thermistor is shown. The general shape of the curve in Fig. 2b is similar to the shape of the curves of Fig. 2a.

In Fig. 2c there is shown a combination of the characteristic curve of Fig. 2b and the characteristic curve for carbon disulphide in Fig. 2a. Since pressure in Fig. 2a and resistance in Fig. 2b are plotted logarithmically these quantities are similarly plotted in Fig. 2c. The characteristic curve in Fig. 2c is substantially a straight line having a slope of approximately 45° or, in other words, a straight line relation exists between the logarithm of pressure and the logarithm of resistance. The significance of the characteristic curve of Fig. 2c is that, by the use of a hypsometer, pressure may be determined with the same percentage of accuracy as resistance if hypsometric errors are zero. While obviously such errors are not zero, I have found that they are extremely small. Such errors are, in general, of the order of magnitude of probable errors in resistance measuring devices having a high degree of accuracy.

Referring again to Fig. 1, temperature-sensing element 4 is preferably arranged to sense the temperature of the vapors of boiling liquid 1 rather than the temperature of liquid 1 itself. While approximately correct indications may be obtained by immersing temperature-sensing element 4 in liquid 1, conditions of superheating may exist therein with resultant uncertainty as to whether the temperature sensed accurately corresponds to the ambient pressure on the surface of liquid 1. Accordingly, in the arrangement of Fig. 1 thermistor 14 is supported at a point above liquid 1 and is arranged to sense the temperature of the vapors thereof.

In accordance with another feature of the arrangement of Fig. 1, as the vapors from boiling liquid 1 escape through passage 13 and thence to the outside of the hypsometer, as indicated by broken line 20, the vapors are in contact with tube 15 containing leads 17 of thermistor 14. This arrangement tends to form a thermal "guard" for thermistor 14 by having leads 17 pass through the vapors of liquid 1 thereby reducing the thermal gradient along leads 17 and providing the maximum accuracy of the indication obtained from thermistor 14.

In the use of a hypsometer having relatively low dissipation, superheating may occur in the vapors above the boiling liquid, as well as in the liquid itself. However, if the temperature sensing element arranged to sense the temperature of the vapors in a hypsometer is kept wet, the element is maintained substantially at the true boiling temperature of the hypsometer liquid by a film of liquid in equilibrium with the surrounding vapors. Heat lost by the superheated vapors causes evaporation of the liquid on the temperature-sensing element rather than an increase of temperature thereof. On the other hand any tendency of the element to be cooled is offset by condensation of the surrounding vapors thereon. Accordingly wick 11 in Fig. 1 is arranged to encase thermistor 14 and to dip into liquid 1, thereby conveying liquid 1 to thermistor 14 and providing a wetting action therefor.

Referring now to Fig. 3, there is shown an arrangement of a hypsometer similar to the arrangement shown in Fig. 1, except that a supplementary condensing surface is provided in the form of a helical surface 21 in passage 13 of insert 9'. Helical condensing surface 21 is arranged so that the escaping vapors of boiling liquid 1 pass therealong in escaping from the hypsometer, as indicated by broken line 20'. Helical surface 21 may be formed of a material such as metal and attached to insert 9', or may be formed of the same material as insert 9' and made integral therewith. In escaping from the hypsometer the vapors of boiling liquid 1 encounter a gradual reduction in the temperature of adjacent surfaces. Because of increased area substantially greater condensation takes place on condenser 9' than would be the case if the escaping vapors contacted only the inner surface of passage 13. Condensed vapors of liquid 1 fall by the action of gravity into the main portion of liquid 1 contained in flask 2 and what I have chosen to call "reflux action" of liquid 1 takes place. It is obvious that other shapes and configurations of a condensing surface to produce maximum reflux action may be made and it is not intended that my invention be limited to a helical condenser of the type shown in Fig. 3.

Reflux action tends to prolong the duration of the liquid in a hypsometer, thereby permitting boiling for a longer period of time with a minimum amount of heat. While maximum reflux action may be desirable in certain cases, the structure of Fig. 1, wherein a supplementary condensing surface is not included, is satisfactory for ordinary purposes.

In accordance with my invention a hypsometer may be constructed which is particularly suitable for extremely high altitude measurements in connection with radio-sonde apparatus or the like. Such a hypsometer may be made having an approximate diameter of one inch, a total length of four inches, and a weight of approximately 50 grams. By the use of a suitable liquid, minimum atmospheric pressures of approximately 0.5 millibar, corresponding to an altitude of 200,000 feet, may be measured. If indicating instruments are sufficiently accurate, determinations of pressure may be made within an accuracy of approximately 0.02 percent.

A particular feature of my invention is that a hypsometer constructed in accordance therewith may be employed under certain conditions without the use of a heating element to supply heat to maintain boiling of the hypsometer liquid. The conditions to be satisfied in using a hypsometer in such a manner are as follows: the liquid must contain initially sufficient latent heat to cause initial "self-boiling" under the desired ambient pressure conditions; the ambient pressure to which the hypsometer liquid is subjected must be constantly decreased; and the rate of such decrease of pressure must lower the boiling temperature of the hypsometer liquid at a rate greater than the rate at which the temperature of the liquid is lowered by heat losses other than losses due to boiling.

In other words, if the boiling point of a hypsometer liquid is lowered by a particular amount due to a decrease in ambient pressure, while the thermal losses from the hysometer liquid by conduction and radiation through the hysometer walls and otherwise lower the temperature of the liquid by a lesser amount, self-boiling of the liquid occurs tending to remove heat from the liquid to establish equilibrium between the temperature of the liquid and the boiling temperature thereof.

An example of an advantage in the use of a hypsometer without a heating element may be found in measuring extremely high altitudes in connection with a radio-sonde. In such cases there is often no interest in measuring altitude until an altitude of 50,000 feet is reached. If carbon disulphide is employed as the hypsometer liquid, the boiling temperature thereof at 50,000 feet is approximately zero degrees centigrade. In order to conserve the hypsometer liquid it may be desirable to fill the hypsometer at ground level with liquid which has been cooled below its boiling temperature at 50,000 feet, or in the case of carbon disulphide to some temperature less than zero degrees centigrade. Thus by suitable design of the hypsometer, boiling of the liquid does not occur until an altitude of 50,000 feet is reached. If the rate of ascent is sufficiently great, the accompanying decrease of ambient pressure maintains boiling during the remainder of the ascent and no supplementary heat need be added at any time.

While in the example above the liquid is cooled below normal atmospheric temperatures at ground level before being placed in a hypsometer, in other cases it may be desirable to heat the liquid above ground level temperature to effect boiling at a lower altitude. In any case the liquid is provided with a latent heat sufficient to effect boiling under the desired ambient conditions and such boiling is maintained by lowering the boiling temperature of the liquid due to a continual decrease of ambient pressure. The required rate of decrease of pressure is dependent on the rate of heat loss from the hypsometer liquid as affected by heat dissipation constant of the hypsometer and the temperature of the ambient medium surrounding the hypsometer.

While I have shown and described a preferred embodiment of my invention, it will be understood that my invention may well take other forms, and I, therefore, aim in the appended claims to cover all such changes and modifications as fall within the true spirit and scope of my invention.

What I claim as new and desire to secure by Letters Patent of the United States is:

1. A hypsometer for use as a pressure measuring instrument in a radiosonde, or the like, where said instrument is exposed to a pressure constantly decreasing at a substantially predetermined rate comprising a chamber adapted to contain an ebullient liquid and being subjected to an ambient pressure, said chamber having insulation means substantially surrounding the space enclosed by the chamber, and a temperature responsive electrical element positioned to sense the boiling temperature of said liquid when there is liquid in said chamber, the response of said element being indicative of the ambient pressure, the insulation of said vessel having sufficient extent and being of such heat insulating character that the heat transferred from said liquid when it is boiling and the ambient pressure is decreasing, is less than the decrease of the heat necessary to maintain said liquid in boiling condition due to decrease of said pressure.

2. Apparatus as claimed in claim 1 including thermal insulating means to insulate the mouth of the vessel, said means extending into said vessel and providing a condensing surface for vaporous material.

3. Apparatus as claimed in claim 1 wherein the vessel has a double wall defining an evacuated space.

References Cited in the file of this patent

UNITED STATES PATENTS

| Number | Name | Date |
|---|---|---|
| 1,754,963 | Osborn | Apr. 15, 1930 |
| 2,252,750 | Basch | Aug. 19, 1941 |

FOREIGN PATENTS

| Number | Country | Date |
|---|---|---|
| 269,480 | Germany | Jan. 21, 1914 |
| 514,355 | Great Britain | Jan. 26, 1938 |
| 519,083 | Great Britain | Mar. 15, 1940 |

OTHER REFERENCES

Ebulliometric Measurements by W. Swietoslasski, 1945, pgs. 3–5, 13, 21–22, and 37.